United States Patent [19]

Stutman

[11] Patent Number: 5,291,518

[45] Date of Patent: Mar. 1, 1994

[54] LINK SYSTEM FOR RADIO PAGING SERVICE

[75] Inventor: Peter S. Stutman, Sudbury, Mass.

[73] Assignee: Metriplex, Inc., Cambridge, Mass.

[21] Appl. No.: 755,659

[22] Filed: Sep. 6, 1991

[51] Int. Cl.[5] .................... H04B 3/36; H04L 25/60
[52] U.S. Cl. .......................................... 375/4; 375/5;
375/107; 370/95.3; 455/15; 455/22; 455/24
[58] Field of Search .................. 375/3, 4, 7, 5, 107;
455/15, 20, 23, 12.1, 19, 22, 24, 54.1; 370/77,
97, 95.1, 95.3, 104.1

[56] References Cited

U.S. PATENT DOCUMENTS

| | | | |
|---|---|---|---|
| 4,230,989 | 10/1980 | Buehrle | 375/4 |
| 4,383,331 | 5/1983 | Davidson | 455/24 |
| 4,490,818 | 12/1984 | Otsuka | 375/4 |
| 4,930,118 | 5/1990 | Sugihara | 370/97 |
| 4,947,451 | 8/1990 | Nawata | 370/104.1 |

*Primary Examiner*—Curtis Kuntz
*Assistant Examiner*—Young Tse
*Attorney, Agent, or Firm*—Cesari and McKenna

[57] ABSTRACT

Linking of radio paging transmitters is accomplished through the utilization of TDM transmission on the same channel as that assigned to the paging service, thus eliminating the necessity of a separate channel for linkage of the remote transmitting sites to a central originating location. For data transmission, real time data is broadcast via a direct RF link to buffer storage at each of the remote transmitting sites, with the data being read out to each of the paging transmitters from the local buffers in a phase-adjusted synchronized fashion under control of sync signals generated at and broadcast from the central originating location. The data transmission rate from the central originating location to the remote sites may be made significantly higher than the radio paging data rate in order to minimize link time to minimize linkage overhead by reducing the amount of time the channel is used for linkage as opposed to paging. Additionally, analog material such as audio signals may be converted to digital signals and transmitted to the remote transmitting sites, with the digitized audio information being stored in buffers and converted back to audio when the buffer is read out. Directional antennas may be utilized between the central originating location and the remote transmitting sites to improve the signal to noise ratio over omni-directional broadcasting for increased link data rates.

6 Claims, 2 Drawing Sheets

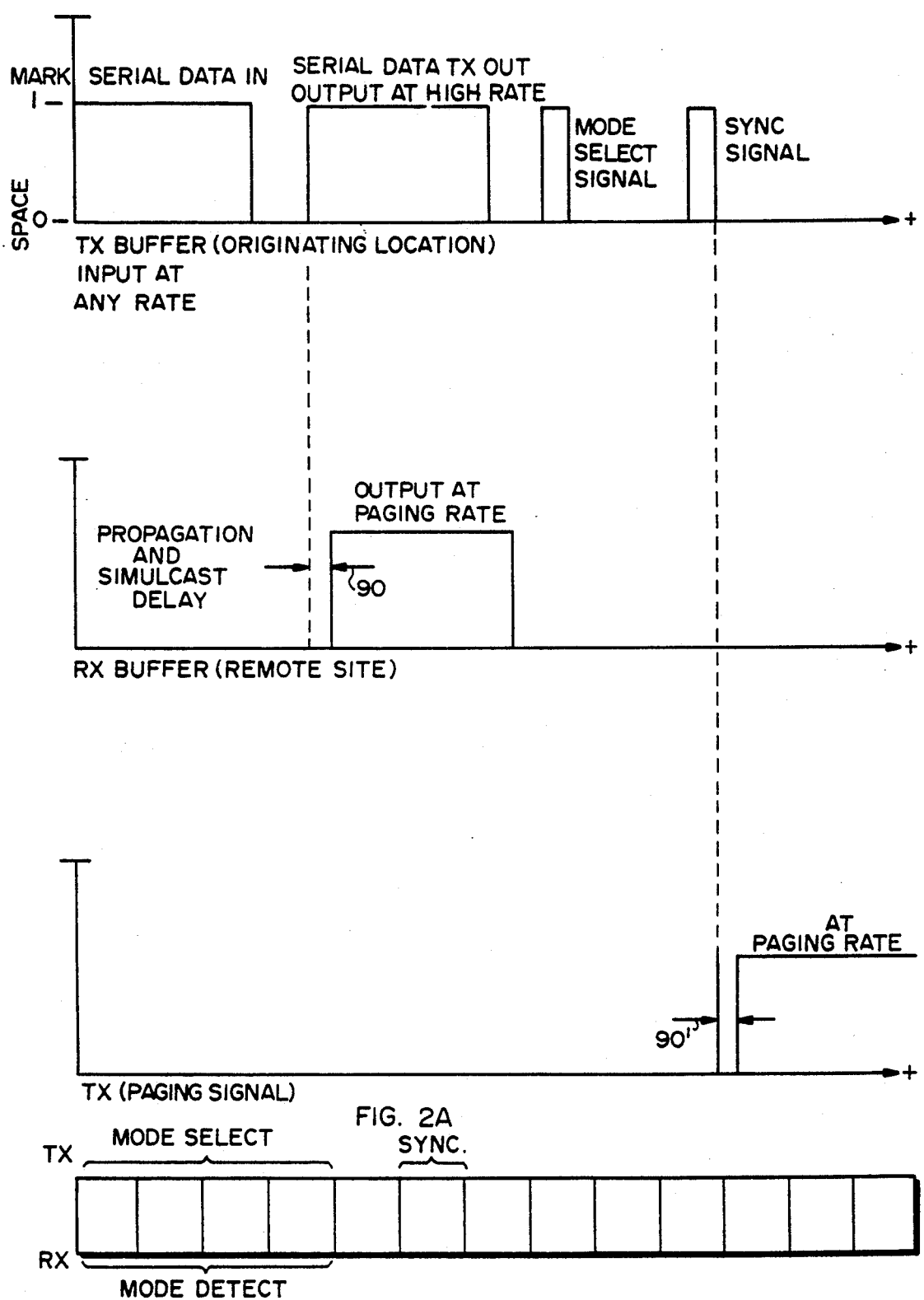

LINK SYSTEM FOR RADIO PAGING SERVICE

FIELD OF THE INVENTION

This invention relates to radio paging systems and more particularly to a method and apparatus for eliminating the necessity of separate RF channels for the linking of remote transmitters in the system to the originating master.

BACKGROUND OF THE INVENTION

As will be appreciated, radio paging consists of a number of remotely located radio transmitters which are controlled from a master transmitter at a central originating location to provide a simultaneous broadcast or simulcast of information destined to be received by a portable pager usually carried on the person, with the pager providing either audio or digital information, or both. The utilization of multiple remote transmitters is required for reliable transmission in urban areas where the remote transmitters may be as close as 2 or 3 miles apart to accommodate a very dense urban environment in which one is concerned about building penetration. On the other hand the remote transmitters may be quite distantly spaced apart, perhaps 30 or 40 miles in rural areas.

One method of linking remote transmitters has involved telephone land lines between the originating central location and the remote sites, with simulcast phasing problems being solved through the utilization of programmed phase delays. These delays are calculated to accommodate lump delays associated with switching equipment, as well as delays associated with transmission over a lengthy cable network. However, while it is theoretically possible to compensate for variable phase delay, phasing throughout the network is difficult to achieve. Moreover, the expense of leased telephone lines is oftentimes prohibitive.

The primary method used for linking the central originating location with remote transmitting sites involves the utilization of RF link channels, in which the RF link channel is different from the paging channel utilized in the transmission of signals from the remote transmitting sites to the individual pagers.

It should be noted that link frequencies or channels are allocated between the so-called midband of 72 MHz and a newly legislated band centering around 900 MHz. Presently, the carrier frequencies for pager transmission is in bands varying between 35 and 931 MHz. In general, two different channels are used in normal terrestrial radio paging, namely the link channel and the paging channel.

The problem with an RF link system is overcrowding in which there are not enough link channels to satisfy demand for paging, and the fact that two channels of similar bandwidth are needed to provide throughput on one channel.

Note that most radio paging apparatus presently licensed are frequency modulated (FM) and that the width of the radio link channel as assigned by the FCC is typically between 20 to 25 KHz with appropriate guardbands. This means that the opportunities for a clear channel link are scarce and becoming even more scarce with the proliferation of paging services. Further, with a proliferation of radio paging services, not only have the paging channels been spoken for or allocated, it is also true that link frequencies are no longer available. Since land line and fiber optic linking systems are prohibitively expensive or technically difficult, link frequencies or channels are almost as valuable as paging frequencies or channels due to present overcrowding and the numbers of parties seeking FCC licenses.

In view of the increased usage of radio paging for not only voice messages but also digital data, the problem is one of frequency allocation. There is therefore a necessity for a system which will not increase the number of channels used while linking the remote transmitters, all the while not disturbing the entire body of technology related to simultaneous broadcasting.

The history of simultaneous broadcasting or simulcast has been one of reducing interference between two adjacent remote transmitters when both their signals are received by a pager in an overlapping broadcast area. Traditionally this problem has been solved by synchronizing the transmission from all remote stations to provide as close to an in-phase modulation condition as possible at all locations within the broadcast area. While FM capture is responsible for a pager locking out all strongest signal, problems exist especially in dense urban areas, with the problems being particularly severe with respect to audio transmission in which audio waveforms as received by the portable pager must be exactly in sync or very close.

In simultaneous broadcasting, it is not the carrier phase which is controlled but rather the phase of the modulation. In general, synchronization is accomplished through the interposition of a delay, typically in microseconds, with the individual delays at certain overlap points adjusted for optimal reception by pagers in the intended coverage area through adjustment of the simulcast delay parameters, given field data at various overlap points.

Since present simulcasting techniques permit successful receipt of audio, this also benefits the transmission of data to alpha-numeric pagers, since data transmission is significantly less sensitive to phase variation.

Typically, what has been accomplished in the past for RF linking is to provide a master link transmitter typically at the highest possible location such as on a mountain or tower or the like. RF links do not suffer from multipath distortion mainly because the antennas at both the master link transmitter and the remote transmitter are fixed with an unobstructed line-of-sight transmission. Moreover, fixed antennas can be of higher gain or can even be made directional to increase the signal-to-noise ratio. As will be appreciated, RF links do not suffer the same type of phase variability problems as telephone lines because antenna locations are fixed and the landline paths are not, due to variable paths through the telephone network.

SUMMARY OF THE INVENTION

In order to take advantage of the high gain fixed antenna system configuration, and in order to alleviate congestion within the radio paging bands signalling between the originating central location and the remote sites is accomplished on the same channel as the radio paging channel in one embodiment, through time division multiplexing (TDM).

In a preferred embodiment, digital information is transmitted at a relatively fast rate between the central originating location and all of the remote sites via direct RF link in which the transmitted information is stored at a local buffer, with one buffer per remote transmitting location. In addition to the digital data transmitted via RF link, synchronizing signals are transmitted after the buffers have been loaded so as to be able to key the remote transmitters in a predetermined timed relationship after receipt of a synchronization pulse or message from the master. Thus, all remote buffers are readout to the modulation sections of the transmitters in a relationship timed through the synchronizing signals.

Each remote transmitting site is provided with a receiver coupled to the antenna utilized for the radio paging broadcast, in which the receiver is tuned to the same frequency as that associated with the paging channel and is shielded from paging transmission through the use of a switch which protects the receiver by either disconnecting it from its antenna or by shorting it. Alternatively, any conventional receiver protection circuit can be used to shield the receiver during paging transmission. In a given time slot, for TDM links, a synchronizing signal is transmitted to load all of the local buffers with data.

It is noted that it is technically feasible to provide local clocks which are sufficiently stable such that when they are activated by a sync pulse from the central originating location, they can maintain phase coherence for a number of minutes. It will thus be appreciated that clock variation or jitter will not be significant over a period of between one and two minutes such that the necessary synchronization for data transmission and reconstruction or readout can be handled by a local clock which is stopped and restarted periodically or is phased through the utilization of the synchronization signals from the central originating location.

In one embodiment, two-way signalling from the local station back to the originating location is possible to indicate a full buffer or some error condition. Moreover, it is of course possible to provide for single antenna use or a separate receive, high gain antenna for the link RF, such that the signal-to-noise ratio can be increased.

In operation, after the buffers are loaded, with a single start pulse, each of the buffers is clocked out at the same rate. Various delays can be built into the system such that terrestrial travel distance delays can be inserted, which are those delays which are normal in a simulcast network. Thus, transit delays and other delays may be accommodated through fixed delays in the start pulses for the clocking of the individual buffers.

Specifically, what is provided is an autolink module which hooks up between the modulator terminals of the individual remote transmitter and its antenna through a diplexer or duplexer arrangement. As referred to above, separate antennas may be utilized, with high gain directional antennas being preferred to omni-directional antennas to improve signal-to-noise ratios and thus data rates.

Note that the currently used data rates for radio paging are the 512 baud and 1200 baud rates. There is also a European standard called ERMES which involves a 64 kilobit per second data rate. It will be appreciated that relatively standard stable crystal clocks are available for the clocking out of the buffers at these baud rates such that the clocks will stay stable for a period of minutes without clock skew between sites. The usual transmitted format is the so-called NRZ mark and space format, with the mark happening to correspond to a negative FM deviation. Thus, at these relatively low transmission rates, timing in terms of starting the local clocks is not a problem. However for such systems, more accurate crystal control is available at increased cost.

As one embodiment, it is of course possible to resync at any time by inhibiting the readout of the buffer, reinitializing the clocks, and starting the buffer output after reinitialization.

It is also possible with respect to data compression that other data modes than ASCII can be utilized to transmit data from the central originating location to the remote buffers. Thus data may be sent out at 9.6 kilobits per second while still arranging that the paging signal go out at 512 baud over the paging channel.

It is of course important that one not use too much of the channel or overhead in order to provide the link function. Thus if link data rates are increased, one can decrease the amount of time devoted to the linking operation and thereby increase the occupied bandwidth. Thus, rather than utilizing 50 percent of a channel for linking operations, as little as 5 percent can be utilized.

The subject system also addresses the delay situation in which recipients can oftentimes wait as much as 15 minutes for a transmission due to a paging backlog at peak hours. For example, it will be appreciated that on a 512 Post Office Code Standard Advisory Group (POCSAG) channel, one can communicate with at least 50,000 customers on the channel. During peak usage, a significant portion of these customers it require access, resulting in access delays which are at best annoying. While the subject system does not alleviate this problem, it does not make it significantly worse. By increasing the data transmission rate over the link to the remote station, the overhead can be greatly reduced to an amount which does not significantly impact the available paging air time on the channel. For example, increasing the link data rate to 9.6 kb results in an of only 5% in a 512 baud paging channel.

In summary the linking of radio paging transmitters is accomplished on the same channel as that assigned to the paging service, thus eliminating the necessity of a separate channel for linkage of the remote transmitting sites to a central originating location thereby freeing-up additional channels. For data transmission, real time data is broadcast via a direct RF link to buffer storage at each of the remote transmitting sites, with the data being read out to each of the paging transmitters from the local buffers in a synchronized fashion under control of sync signals generated at and broadcast from the central originating location. The data transmission rate from the central originating location to the remote sites may be significantly higher than the radio paging data rate such that the accompanying data compression results in less link time and correspondingly more message transmission time so that the overhead associated with linkage can be greatly reduced. Additionally, analog material such as audio signals may be converted to digital signals and transmitted to the remote transmitting sites, with the digitized audio information being stored in buffers and converted back to audio when the buffer is read out. Directional antennas may be utilized between the central originating location and the remote transmitting sites to improve the signal-to-noise ratio over omni-directional broadcasting for increased the signal to noise ratio.

BRIEF DESCRIPTION OF THE DRAWINGS

These and other features of the subject invention will be better understood taken in conjunction with the Detailed Description and the Drawings of which:

FIG. 2A is a timing diagram showing the time slots allocated for buffer loading and buffer readout for the buffers at the main centrally-located transmitter and those at the remote transmitting sites; and, FIG. 2B is a code sentence for designating a digital or analog mode for the data transmitted, also including a sync pulse usable at the remote sites.

DETAILED DESCRIPTION

Figure 1:
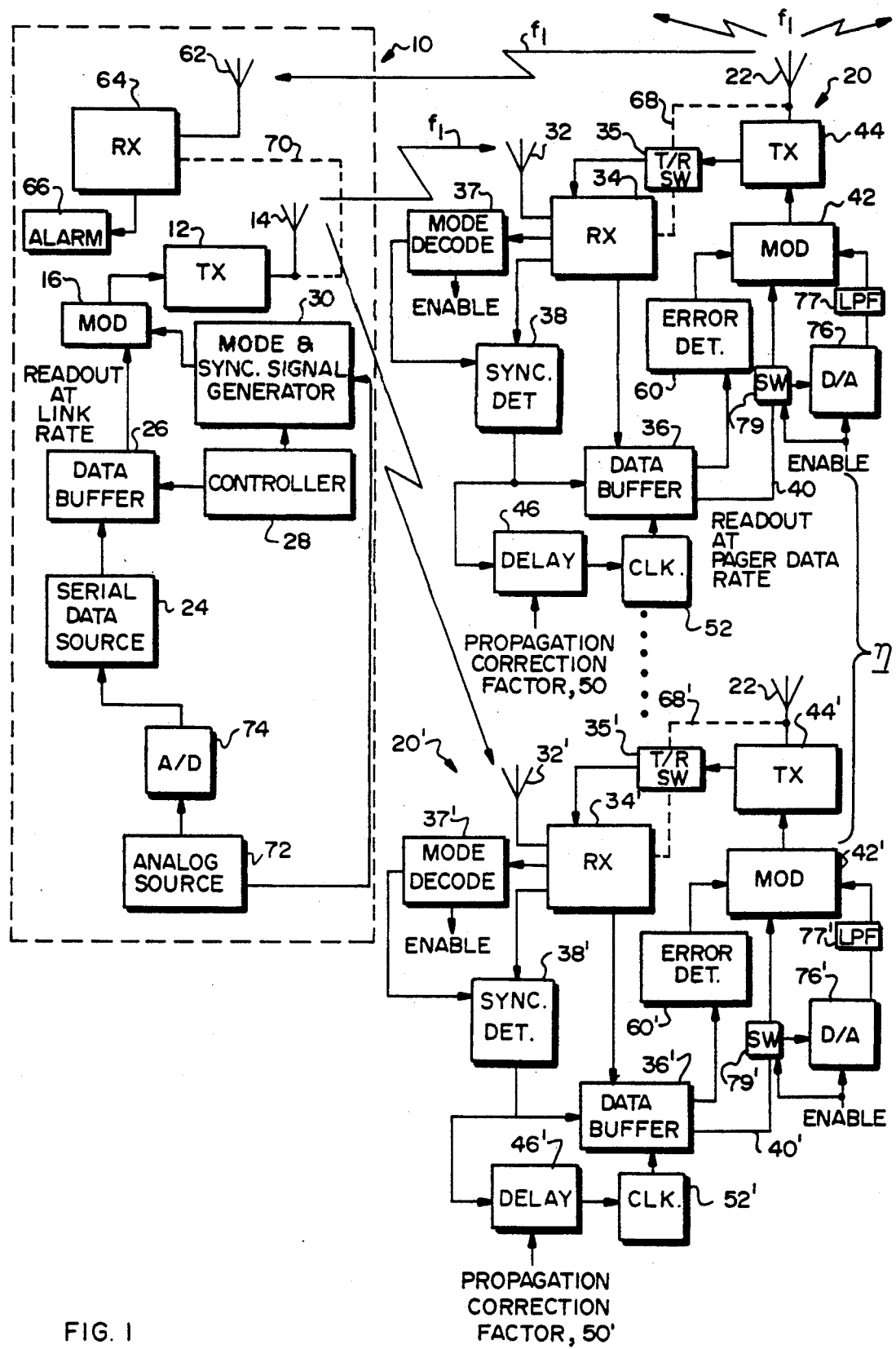
FIG. 1 is a block diagram of the subject system illustrating a time division multiplex system which provides link signals on the same frequency as that of the radio paging transmitters.

Referring now to FIG. 1, a master transmitting facility 10 at a central location includes a transmitter 12 having an antenna 14, with a modulator 16 coupled to the transmitter. Transmitter 12 provides an FM signal on a carrier frequency $f_1$ which is transmitted to remote transmitter sites generally indicated by reference character 20, each of which broadcasts data and other paging information via an omni-directional antenna 22 as an FM broadcast having a carrier frequency $f_1$ as illustrated.

Paging data is entered via a serial data source 24 coupled to a data buffer 26 the operation of which is managed by a controller 28. Data buffer 26 is read out at a predetermined link rate, in one embodiment a good deal higher than the pager data rate. Once data buffer 26 has been loaded, the information therein is readout to modulator 16 at such time as it is desired to transmit this data to the remote sites. After the transmission of this data to load the buffers at the remote sites, a mode signal and a sync pulse or signal are generated via generator 30, the output of which is applied to the modulator such that a sync pulse or signal is generated to enable the readout of this data at all the remote sites; and such that the type of transmission is specified in terms of whether the data to be transmitted to a pager is analog or digital.

At the remote site, a separate antenna 32 may be provided to receive the RF signal from antenna 14. The propagation path between the two fixed antennas provides for direct line-of-sight propagation in which high gain antennas may be utilized for antenna 14 and antenna 32, which antennas may be directional for increased signal-to-noise ratios and link data rates that can exceed 9.6 kilobits per second.

The output of antenna 32 is coupled to a receiver 34, the output of which is coupled to a data buffer 36 such that data loaded into buffer 26 and transmitted from the master transmitter is provided to the buffer. As can be seen, a unit 35 is coupled to the transmitter at the remote site to detect when the paging transmission occurs and protects receiver 34 either by interrupting or shorting its antenna connection, or by activating protection circuits within the receiver, As simple T/R switch may be used for this purpose, or more elaborate conventional protection methods may be employed.

The output of receiver 34 is provided to a mode decode unit 37 which detects whether the transmission to a pager is to be analog or digital and to a sync signal detector 38 which detects the aforementioned sync pulse or signal. Thereupon detector 38 enables the readout of buffer 36 such that upon clocking of this buffer, data is provided over line 40 to a modulator 42 coupled to a paging transmitter 44 connected to antenna 22.

In order to accommodate propagation delays between the master transmitter and the particular remote location to permit in-phase modulation from all of the remote sites, a delay unit 46 is coupled to the output of sync detector 38 which is provided with a propagation correction factor 50, or other delays which are utilized to effectuate the simulcast transmission.

After delay, the sync pulse is applied to activate clock 52 for the clocking out of data from the data buffer. The clock rate and thus the data rate for the remote location is in general at a lower rate than the link data rate. In one embodiment, the pager rate is as low as 512 band so as to accommodate standard alphanumeric pagers.

As an optional feature, a buffer full signal may be detected by an error detection unit 60 which is coupled to modulator 42 for the generation of a signal to be broadcast from antenna 22 back to the originating location. This signal is coupled via an antenna 62 to a receiver 64 which, upon receipt of a buffer full signal, activates an alarm unit 66 of any suitable type to inform operators at the originating site that a buffer full condition exists at one of the remote sites. Alternatively, any alarm condition at the remote site may be signalled in this manner.

It will be appreciated that any coding scheme may be utilized for the transmission of the alarm condition signal including providing a time within the broadcast cycle for the transmission of such a signal back to the originating site. Alternatively, subcarrier techniques may be utilized in this system.

In general, it is desirable to transmit information between the remote sites and the originating site via signalling at the pager carrier frequency such that with appropriate isolation, receivers 34 and 64 can be coupled respectively to a single antenna at the respective site. These connections are illustrated by dotted lines 68 and 70, with conventional diplexing arrangements being utilized. Thus, if desired, antennas 32 and 62 can be eliminated from the system.

The benefit of utilizing separate antennas 32 and 62 is that it is possible to increase the signal-to-noise ratio for the linking function by virtue of having directional antennas either at the remote sites or at the master transmitting site or both. Of course, because of the use of fixed antennas, high gain omni-directional antennas can also be used which are an improvement over the small pager-carried antennas and which provide improved signal-to-noise ratios, even without directionality.

It will be appreciated that multiple terrestrial remote paging sites are contemplated and is illustrated at 20'. The remote site is duplicated as many times as necessary to provide the required overlapping coverage, with the units at the remote sites being indicated by the various primed numbers.

It will be appreciated that detector 60 may detect other conditions than the simple condition of a full buffer. Unreliable data may be detected by conventional means and a signal transmitted back to the originating site or location to indicate any of a variety of problems at a remote site. It is important to note however that this signalling is done at the carrier frequency of the remote paging network, with time allocated for transmission of data, syncing of the readout of data buffers at remote sites, and receipt of alarm condition signals transmitted back to the originating site.

It will also be appreciated that not on propagation correction factors be different for each of the remote sites but other factors relating to in-phase modulation will be affected by the unique geography and antenna radiating patterns associated with each of the remote sites. Building in a delay such that at an arbitrary point within an overlap region pager all received modulation will be in-phase is a somewhat complex subject. As to a propagation correction factor, since the speed of light is known and the distance between the transmitting antenna 14 and receiving antenna 32 is known, propagation correction factors may be readily calculated and provided by delay unit 46, such that all of the data buffers in all of the remote sites are clocked starting at a time delayed by that exact amount which will cause an in-phase modulation condition in the overlap areas, or at least at critical points within an overlap area.

The delays associated with providing an in-phase condition in overlap broadcast areas i s presently accomplished through testing for in-phase modulation at one or more points within the overlapping broadcast area. Phase detecting apparatus is coupled to a receiver and the mobile unit moved about in the overlap area, with phase adjustments being made at the individual remote sites contributing to the overlap. Thus the phase of the modulation of the received signals at various points within the overlap area is adjusted to as close to zero as possible.

As can be seen, one technique of providing as close to perfect in-phase conditions at all points within the overlap area is provided through sampling signals throughout the area and making those adjustments which, on average, provide for in-phase modulation conditions throughout the area. In some instances, due to the particular topography, building structures and the like, specific phase adjustments are made for these local anomalies via a cut and try method, in which various phase delays are employed and the results monitored.

As an alternative method, automatic phase adjustment for overlap areas within the broadcast regions of adjacent remote sites is accomplished through one of many algorithms or routines such as those referred to in Glenayre Electronics Ltd. of Quincy Illinois Operator's Manual QPN 9150069400 which describes their simulcom/simulcast system. Regardless of the method used for determining the appropriate delay for each site, the appropriate delay, whether developed conventionally or otherwise is implemented by the delay unit for each remote site.

The subject system may also be utilized in the transmission of audio data or any other analog data, through the utilization of an analog source, usually audio, here illustrated by reference character 72, the output of which is applied via an analog-to-digital converter 74 to serial data source 24. Thus, analog data is converted to digital data, which is stored in buffer 26 and is read-out under the control of controller 28 in a multiplexed fashion such that the audio can be faithfully reproduced after having been stored in data buffer 36 at the remote site.

For audio transmission, analog source 72 instructs generator 30 to provide a signal indicating the presence of audio data to be transmitted to a remote site, even though the transmission to the remote site is via a digital data stream representing the audio material. It will be appreciated that the presence of digital data is detected at the remote site by detector 37 which enables a digital-to-analog converter 76 that is coupled through a low pass filter 77 to modulator 42. Thus when data is shifted out of buffer 36, it is converted into audio data by converter 76 and is used to modulate transmitter 44 with reconstructed audio. At this time the digital output of buffer 36 is inhibited from being applied to modulator 42 via switch 79 controlled by the enable pulse from mode detector 37. Note that low pass filter 77 is utilized to reduce digital noise and artifacts created by the digital to analog conversion.

In general, for alphanumeric pagers which also include an audio or analog function, the presence of analog data is indicated through providing any type of distinctive signal to modulator 16 which provides an analog alert signal, again at the paging system's carrier frequency. This signal is detected as an output of receiver 34 by detector 37 which provides an enable pulse to digital to analog converter 76 and to switch 79. This enable signal may also be utilized to provide a different clock rate to buffer 36 or to provide in general that buffer 36 is clocked at a rate suitable for analog material, eg. at a rate commensurate with conventional digital-to-analog conversion.

Note that the sync signal may either be the leading or trailing edge of a pulse, or may be the detection of a preselected code or sentence, or portion thereof, which upon detection constitutes the sync signal. It will be appreciated that timing associated with the decoding process may be made constant or uniform such that propagation delays can be appropriately set or maintained.

The sync pulse or other signalling may also be accomplished conventionally through the utilization of pulses of increased magnitude and of opposite polarity or direction such that remote sites can be alerted to both their timing needs and the need for conversion from an alphanumeric paging to analog paging.

Referring now to FIG. 2A, in one embodiment for the time division multiplexing associated with FIG. 1, the upper graph shows that for the buffer at the originating site, serial data "in38 occupies a predetermined time slot, whereas serial data "out" occupies a further time slot. The time slots are allocated in such a way that maximum benefit is achieved through higher data rates which are available due to the point-to-point transmission of data from the master transmitter to the remote site. Additionally, if analog data is contemplated, a signal indicative of mode is illustrated as being generated either before or after serial data has been transmitted to the buffers at the remote sites. The transmission of this data can be at any practical rate which permits the data-loading operation to take up a minimal amount of time allocated for transmission of data to pagers.

Referring now to FIG. 2B, it can be seen that the mode and sync signals can be part of a code or fixed format sentence which both specifies mode and sync. As to the code, the mode portion of the sentence can be in any fixed format, with the code being generated and transmitted from the master transmitter and received at all sites by any conventional code recognition circuit configured to detect the particular mode code. The mode code can designate any of a variety of transmission modes such as data, voice, or any other specialized transmission which might require reconfiguration of all remote sites. Thus, in addition to distinguishing between audio and data, the mode sentence can specify transmission rates different from those normally used in order to accomodate specialized transmissions.

With respect to the sync signal, this may be the next allocated portion of the fixed format sentence in which sync may be achieved either on the rising or falling edge of the pulse at this position in the sentence.

Note that mode detecting circuits can of themselves produce a sync signal upon decoding of the mode, with timing delays easily established to permit setting of the propagation delays.

Referring now back to FIG. 2A and to the middle graph, it can be seen that it is possible to take care of propagation and simulcast delays, at least at a gross level, by delaying the input to the buffers at the remote site in terms of shifting data to provide a variable amount of dead space in the serial data stream ahead of actual data, such that when the data is clocked out, this no-data period, here indicated by arrows 90, will result in at least a gross correction. However, it is preferable to load the buffers independent of propagation and simulcast delays, with the output of the buffer being delayed as illustrated in FIG. 1 and here at the bottom graph by that amount of time which is appropriate to the individual remote site.

Since at the very least, remote sites will be at varying distances from the main transmitting site, it is easier to program propagation and simulcast delays by delaying the output of each individual data buffer by a predetermined amount, as opposed to programming in a variable amount of dead space for the information carried for each buffer. However, in certain instances this delay will be fixed and can be uniform, assuming relatively uniform distances between the main transmitting site and the remote sites.

It will be appreciated that this latter technique may be defeated through the utilization of so-called fill in systems in which dead areas within buildings such as factories, shopping centers, hospitals, and the like are filled in through the utilization of a low to medium power transmitter with a unity gain roof top antenna. Here, the problem of overlapping coverage is less severe due to the inability of radiation from remote sites to penetrate deep within the building. However there will be overlapped areas towards the outside of the building, with its problem being reasonably well solved through the adjustment of the power to the fill in coverage transmitter such that FM capture occurs within the building but not beyond. Also leak out antenna cables are useful in this fill in coverage application.

It will of course be appreciated that for fill in coverage transmitters, they may be provided with their own specialized propagation correction factor and delay factor such that if the output of the buffer is delayed through delaying of the clocking thereof as illustrated in FIG. 1, even fill in transmitters can be appropriately controlled by the subject system.

Having above indicated a preferred embodiment of the present invention, it will occur to those skilled in the art that modifications and alternatives can be practiced within the spirit of the invention. It is accordingly intended to define the scope of the invention only as indicated in the following claims.

What is claimed is:

1. A wireless paging system for transmitting messages to paging receivers, said system comprising:
   A. a central site including a central transmitter for transmitting paging messages;
   B. A plurality of remote sites, each including:
      1) means for receiving said paging messages from said central site,
      2) means for retransmitting said paging messages to said paging receivers on the same carrier frequency as that of the transmissions from said central site,
   C. means for effecting said transmissions from said central site on a time division basis with the transmissions from said remote sites, the transmissions from said central site being at a high data rate relative to the transmissions from said remote sites, whereby most of the transmission time is utilized for the transmissions to said paging receivers.

2. The apparatus of claim 1 and further including error detector means at each remote site for detecting a predetermined error condition and for generating an alarm condition signal responsive thereto, means for applying said alarm condition signal to a modulator for transmitting an alarm signal back to said central site on the same frequency a said carrier frequency, and means at said central site for receiving an alarm signal and for indicating the presence of same.

3. The system defined in claim 1 including means at each of said remote sites for synchronizing the transmissions therefrom to the transmissions from said central transmitter, whereby the relative times of the retransmissions from said remote sites do not vary.

4. The system defined in claim 3 in which each of said remote sites includes means for delaying the retransmissions from that site relative to the receipt of the transmissions from said central site, whereby the relative times of the retransmissions from the remote sites are such as to provide essentially in-phase modulation of the signals that the paging receivers receive in regions where signals from the remote sites overlap.

5. The system defined in claim 1 which includes the capability of transmitting both analog and digital information to said paging receivers from said remote sites, and wherein
   A. said central site includes a source of analog material, means for covering said analog material to digital format and means for modulating the central site transmitter with said digitally formatted material, and
   B. each of said remote sites includes means for covering the digitally converted analog material received thereat to analog form for modulation of the retransmissions from said remote site.

6. The system defied in claim 5 including means at said central site for transmitting a mo signal indicative of the presence of said analog material and means at each of said remote sites responsive to the receipt of said mode signal for converting the digital signals received from said remote site to said analog form.

* * * * *